May 22, 1945. J. C. STEVENS 2,376,459
FLUID METER
Filed Aug. 18, 1942 4 Sheets-Sheet 1

Inventor
John C. Stevens
By Stevens and Davis
Attorneys

May 22, 1945.     J. C. STEVENS     2,376,459
FLUID METER
Filed Aug. 18, 1942     4 Sheets-Sheet 2

Inventor
John C. Stevens
By Stevens and Davis
Attorneys

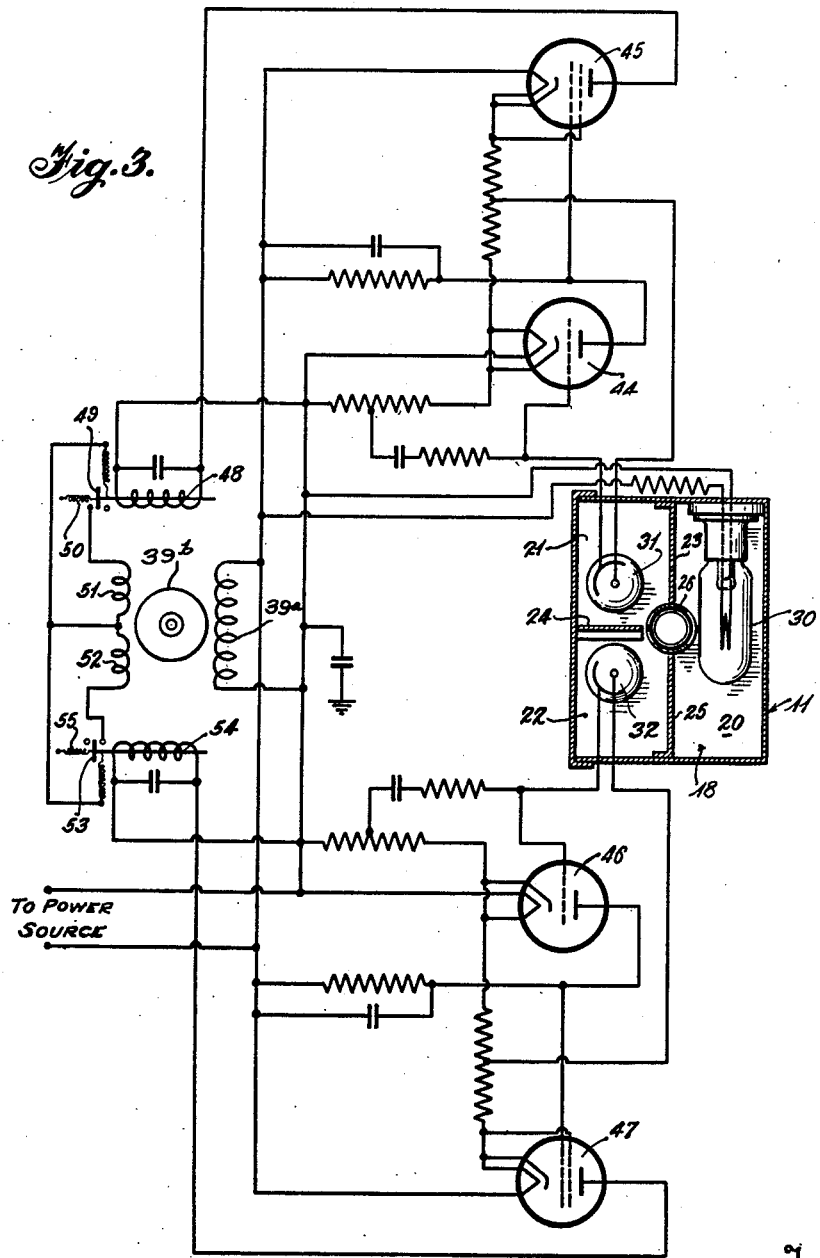

May 22, 1945.   J. C. STEVENS   2,376,459
FLUID METER
Filed Aug. 18, 1942   4 Sheets-Sheet 4

Inventor
John C. Stevens
By Stevens & Davis
Attorneys

Patented May 22, 1945

2,376,459

UNITED STATES PATENT OFFICE 2,376,459

FLUID METER

John C. Stevens, Portland, Oreg., assignor to Leupold & Stevens Instruments, Portland, Oreg., a partnership consisting of Fred Leupold, Marcus Leupold, Robert J. Stevens, and John C. Stevens Application August 18, 1942, Serial No. 455,262

6 Claims. (Cl. 73—205)

This invention relates to registering and recording instruments and is more particularly concerned with the registration, recordation and indication of liquid levels and data correlated therewith.

In connection with the storage and movement of liquids, it is, of course, necessary for the hydraulic engineer to have available means for indicating liquid levels, pressures, velocities and so forth. One of the most widely used instruments in this connection is the manometer which serves directly to measure pressure and may, when used with venturis or restricted orifices, serve also to indicate a function of velocity. The manometer, despite its wide spread use, is subject to several important limitations. In the first place, the pressure differentials indicated by the manometer are transitory in nature and require the attendance of an observer at all times if any record is to be maintained of fluctuations in either pressure or velocity covering any substantial period of time. Furthermore, the shanks of a manometer tube indicate a pressure or a pressure differential, as such, and additional calculations are necessary if these indications are to be read in terms of velocity. Despite these limitations, the manometer, because of its simplicity and reliability, persists as the most popular instrument of its kind.

However, because of the above limitations of the manometer, a wide variety of indicating, registering and recording apparatus has been developed for the purpose of recording pressure or velocity data covering long periods of time as well as to render available direct indications of velocity. Such apparatus, in use, has met with indifferent success, usually due to the complexity of the structures and the incident tendencies toward failure and maladjustment.

It is therefore an object of this invention to overcome the difficulties heretofore encountered in the registering and recording of data correlated with liquid levels and to provide an instrument in which the advantages of the manometer are retained while its limitations are overcome.

According to this invention, it is contemplated that pressure differentials indicated by a manometer may be registered or recorded in terms of functions of pressure as well as pressure itself, and that such registrations may be recorded over long periods of time without the attendance of an operator.

It is further contemplated that the registrations and/or recordations may be made at a station remote from the column of liquid to be measured.

It is a further object of this invention to provide apparatus for the measurement and registration of the level of columns of liquid irrespective of the association of the column with a measuring instrument of the manometer type.

Other objects and advantages of this invention will be apparent upon a consideration of the following detailed description of various embodiments thereof in conjunction with the annexed drawings wherein:

Figure 3 is a view similar to Figure 2, but including diagrammatically the circuits controlling the operation of the register;

Figure 1:
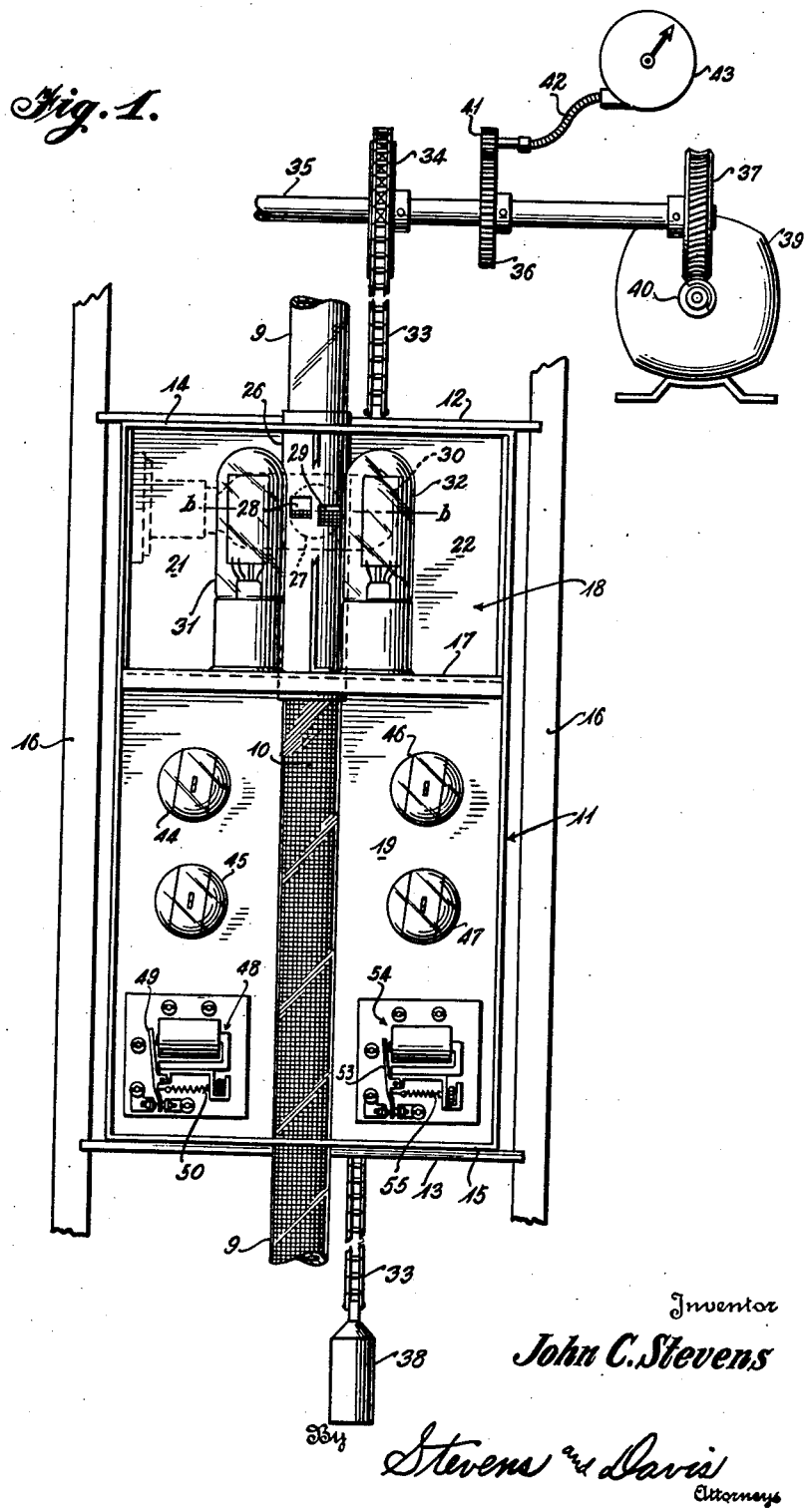
Figure 1 is a view in front elevation of registering apparatus constructed according to this invention showing the same in association with a column of liquid in a transparent tube, the front cover of the housing surrounding a portion of the apparatus being removed for convenience of illustration.
Figure 2:
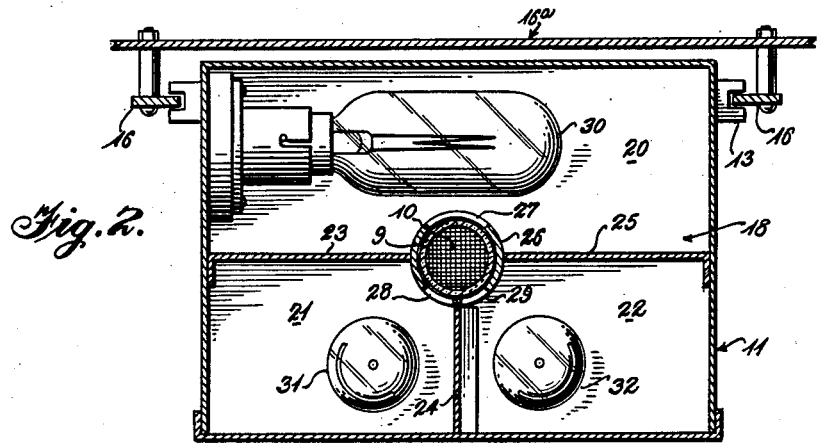
Fig. 2 is a top plan view of the apparatus shown in Figure 1, the top cover of the housing being removed for convenience of illustration.

Referring in greater detail to the construction of Figures 1 to 3, inclusive, the numeral 9 designates a transparent pipe or tube containing an opaque liquid 10, the surface level of which is to be measured. The tube 9 may be one leg of a manometer or may be otherwise connected to a liquid system so that the height of the liquid 10 in the tube 9 will give an indication of pressure or some function of an unknown.

Surrounding tube 9 is a rectangular housing generally indicated at 11. Housing 11 is adapted to move vertically along the axis of tube 9 and to this end it is provided with bars 12 and 13 attached respectively to its top and bottom covers 14 and 15. Bars 12 and 13 are of greater width than the housing proper and are notched at their ends as may be seen in Figure 2 for the purpose of receiving guide rails 16 which may be bolted or otherwise suitably fastened to a support 16a.

Interiorly, housing 11 is subdivided by a horizontal partition 17 into upper and lower compartments 18 and 19, respectively. Upper compartment 18 in turn is divided into three smaller compartments 20, 21 and 22 by vertical partitions 23, 24 and 25. Partitions 23, 24 and 25 extend inwardly from the vertical side walls of housing 11 to a centrally located opaque tubular member 26 which surrounds tube 9 and acts as a further guide for housing 11 which is axially movable along said tube. Tubular member 26 extends vertically from slightly above top cover 14 of housing 11 to a point slightly below partition 17, as can be seen in Figure 1. It should be noted, however, that tubular member 26 does not fully enclose the portion of tube 9 which passes through compartment 18 for one side of tubular member 26 is provided with a round aperture at 27 located approximately in alignment with partition 24, while on the opposite side of tubular member 26, two sight windows 28 and 29 are provided. Sight windows 28 and 29 in tubular member 26 are both in registry with round aperture 27 which is of sufficient diameter to encompass them. Sight windows 28 and 29 are horizontally spaced and somewhat vertically offset as can be seen in Figure 1.

It is contemplated that housing 11 and all of the partitions therein be of opaque material, particularly partitions 23, 24 and 25, cover plate 14 and shelf 17 which define compartments 20, 21 and 22. Tubular member 26 is likewise of opaque material so that light can be transmitted from compartment 20 to compartment 21 only through apertures 27 and 28, while transmission from compartment 20 to compartment 22 is similarly possible only through apertures 27 and 29. Partition 24 abuts tubular member 26 between sight windows 28 and 29 so that there is no light connection between compartments 21 and 22.

In compartment 20, a light source such as an ordinary incandescent bulb 30 is located. This light source is arranged to direct light rays through aperture 27, transparent tube 9 and sight openings 28 and 29 into compartments 21 and 22, respectively. In compartments 21 and 22 photo-electric cells 31 and 32 are positioned adjacent sight windows 28 and 29, respectively. Thus it is that in the absence of opaque liquid 10 in transparent tube 9, cells 31 and 32 may be simultaneously energized by light issuing from the source at 30.

Housing 11 is suspended by a chain 33 which passes upwardly over a sprocket 34 keyed to a shaft 35 which carries additionally gears 36 and 37. Shaft 35 is shown more or less schematically in Figure 1, but it is, of course, contemplated that suitable bearings in support 16a, or elsewhere, be provided. The end of chain 33 remote from the point of attachment to housing 11 is provided with a counterweight 38 so that upon rotation of shaft 35, housing 11 will move easily up or down tube 9 depending upon the direction of rotation of said shaft. To bring about movement of housing 11, an electric motor 39 is connected through a gear 40 with gear 37. Motor 39 may be one of any number of commercial types but is preferably of the split phase type, the field of which is continuously energized. In this type of motor, shorting the shading coil on one pole causes the rotor to turn in one direction and shorting the corresponding coil on the other pole causes it to turn in the opposite direction. It is contemplated that the direction of rotation and the initiation of rotation of motor 39 be controlled by photo-electric cells 31 and 32 in a manner to be hereinafter more fully set forth.

Gear 36 which is mounted on shaft 35 meshes with a gear 41 which drives, through a flexible cable 42, a registering or recording instrument 43 of a type such as shown in any one of the following patents: J. C. Stevens, 1,356,322; J. C. Stevens, 1,303,126; J. C. Stevens, 2,099,180; J. C. Stevens, 2,000,046; and J. C. Stevens, 1,494,034. It will be unerstood, of course, that the construction of the register or recorder at 43 forms no part of the present invention.

It has been stated that light impingement on photo-electric cells 31 and 32 can control the operation of motor 39 and that the operation of this motor will bring about movement of housing 11 and a recordation through apparatus 43. In this connection, it has also been previously stated that liquid 10, a column of which is confined in tube 9, is opaque. Thus, if the level of liquid 10 is above the top of sight opening 28, no light will reach either of cells 31 and 32. On the other hand, if the liquid level is below the bottom edge of sight opening 29, light will impinge simultaneously on both of the cells. It is for this reason that sight openings 28 and 29 are vertically offset so that the liquid may assume a position such as that shown at b—b in Figure 1, wherein sight opening 29 is substantially closed to light while sight opening 28 is open. Thus photo-electric cell 31 may be energized while photo-electric cell 32 is not. The condition illustrated in Figure 1 is the condition of equilibrium in which the rotor of motor 39 is immobilized.

The manner of operation of motor 39 from photoelectric cells 31 and 32 will be apparent upon reference to the circuit diagrams in Figure 3. Radio tubes 44 and 45 are operatively connected to the sensitized plate of photo-electric cell 31 so as to amplify the current generated by light falling on the sensitized plate of said cell. Radio tubes 46 and 47 perform a similar function with respect to photo-electric cell 32. The circuits leading from radio tubes 44 and 45 are connected to a relay 48 having a switch element 49 normally biased to closed position by a spring 50. Switch element 49 of relay 48 controls the circuit to shading coil 51 in the field of motor 39. Shading coil 52 of motor 39 is similarly controlled by a switch element of a relay 54 which element, however, is normally biased to open position by a spring 55, the thrust of which may be overcome by the electromagnet operatively connected to radio tubes 46 and 47 which in turn amplify the generations of photo-electric cell 32. Motor 39 is, as illustrated, of the split phase type having a continuously energized field 39a serving to energize by induction whichever of the shading coils 51 or 52 is in a closed circuit. If relay 48 is deenergized and the switch is closed at 49 shading coil 51 will be in a closed circuit and capable of energization in the same manner as the secondary of a transformer. This will impart to the squirrel cage armature 39b a bias in one direction. If, on the other hand, switch 53 is closed the same situation will obtain with respect to shading coil 52 causing the armature to be biased in the other direction. When the circuits to both shading coils 51 and 52 are open no rotation occurs.

It can be seen that when the opaque liquid 10 in tube 9 is at the level b—b shown in Figure 1, light is substantially shut off from photo-electric cell 32, while light may reach photo-electric cell 31. The electric current emanating from photo-electric cell 31, amplified through radio tubes 44 and 45, serves to energize relay 48 and thereby open switch element 49 against the normal bias of spring 50. In this condition, the circuit of shading coil 51 is open. At the same time, photo-electric cell 32 is not energized so that spring 55 maintains switch element 53 in open position and thereby maintains open the circuit of shading coil 52. Since both shading coils in the field of motor 39 are open, the rotor thereof remains stationary so that shaft 35 is not driven and no recording or movement of housing 11 occurs.

If, at this time, opaque liquid 10 rises in the tube 9, it will shut off the light through sight window 28 to photo-electric cell 31. This releases the armature of relay 48 thereby causing switch element 49 to close the circuit to shading coil 51 under the urging of spring 50. Thus, a rise in the liquid level in tube 9 will cause the rotor of motor 39 to turn in a direction to raise housing 11 and the entire assembly mounted therein until the relative positions of the photo-electric cells and the liquid level reach the equilibrium point as illustrated in Figure 1.

If, on the other hand, the opaque liquid in tube 9 falls with respect to housing 11 and the photo-electric cells mounted therein, sight opening 29 is effective so that light passes from source 30 to photo-electric cell 32. Under these circumstances, relay 54 closes the circuit to shading coil 52 causing the rotor of motor 39 to turn in a direction to bring about the lowering of housing 11 to the equilibrium position. In both cases, rotation of shaft 35 makes a registration or recording automatically and in the absence of an operator.

The width and relative positions of sight openings 28 and 29 determine the sensitiveness of the apparatus. Thus, fluctuations of, for example, .01 of a foot or less or of .05 of a foot or more of the surface of liquid 10 in tube 9 may be permitted without disturbing the balance and causing the motor to be operated to thereby operate the register or recorder.

The combination of photo-electric cells and a reversing motor can be adapted to recording and/or indicating not only liquid levels, but the rate of flow and the total volume of flow wherever the liquid levels or the difference of two levels are an index of such flow. A few such adaptations are illustrated in Figures 4 to 8, inclusive, hereinafter described.

Figure 4:
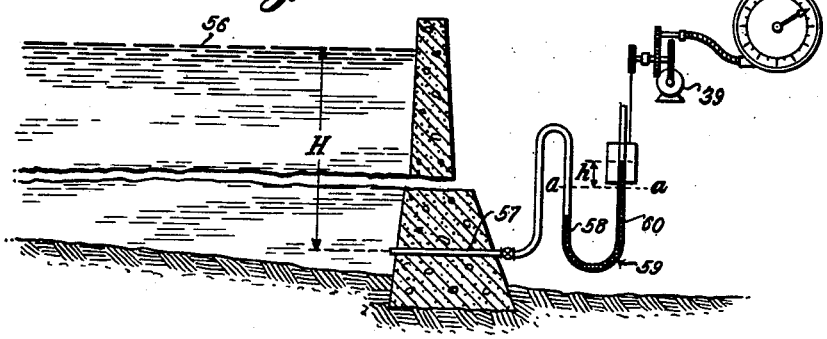
Figure 4 illustrates schematically an adaptation of this invention to the registration of liquid levels in a reservoir.

In Figure 4 there is shown an adaptation of the present invention to the registration of levels in a reservoir generally indicated by reference character 56. From a point beneath the level of the liquid in the reservoir, a tube 57 leads to a leg 58 of a manometer 59, the other leg 60 of which is provided with an assembly such as that described in Figures 1 to 3, inclusive. The head in the reservoir is balanced by mercury in the manometer 59. The photo-electric cell assembly follows the surface of the mercury in leg 60 and its rise h above the balance position of the mercury a—a is proportional to the total head h. The gear that drives the sprocket wheel also turns a spur gear which drives an indicator or recorder of any suitable type. The indicator may be calibrated to show the elevation of the water surface in the reservoir.

Figure 5:
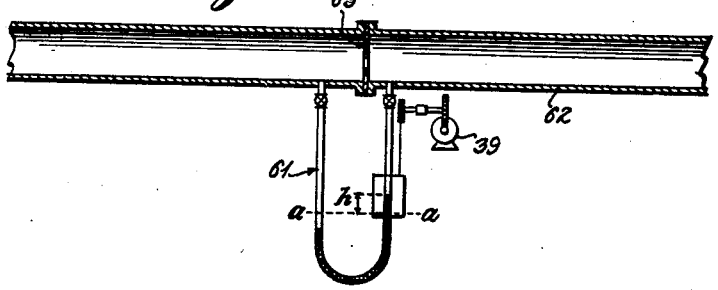
Figure 5 illustrates schematically an adaptation of this invention to the measurement of flow or velocity in a pipe line.

Figure 5 involves a further modification of the present invention to adapt it to the measurement of flow of water in a pipe through a restricted orifice. In this instance, a U-manometer 61 is partially filled with mercury or some other immiscible liquid heavier than water and rendered opaque in any suitable manner. The legs of manometer 61 are connected to a pipe 62 on opposite sides of a plate 63 defining an orifice within the pipe of lesser diameter than the diameter of the pipe. An assembly such as that shown in Figure 1 is operatively connected on the low pressure leg of manometer 61 which, of course, must be transparent. The photo-electric cell assembly follows the surface of the liquid in this leg of the manometer registering the distance h above balance line a—a which is proportional to the total differential head of water on the orifice which in turn is a function of the rate of flow of the water through the orifice. Motor 39, which moves the photo-electric cell assembly, also actuates an indicator or recorder of any suitable type, not shown, which may register and totalize flow. While the construction of Figure 5 has been described in conjunction with the flow of a liquid through pipe line 62, it is apparent that a similar assembly can be used to measure the flow of gas through a restricted orifice in a pipe line.

Figure 6:
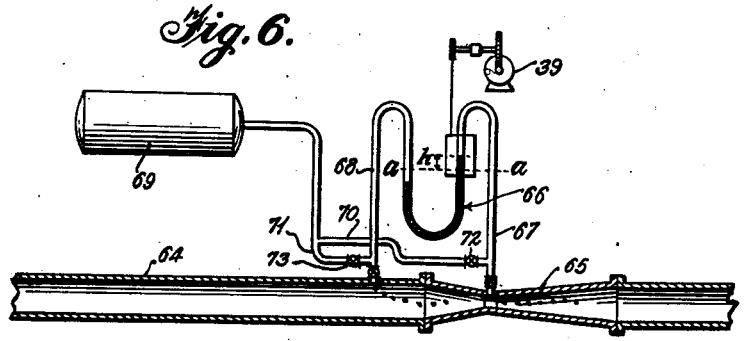
Figure 6 illustrates schematically a modified form of the invention including means for protecting a manometer liquid from contamination when measuring flow velocity.

In Figure 6, there is shown an adaptation of the present invention to the measurement of the flow of a liquid, such as sewage, containing contaminants which would foul the manometer if the liquid were allowed to come in contact with the column of measuring liquid. A sewage pipe line 64 is provided with a venturi at 65. A manometer 66 has one leg thereof connected by pipe 67 to the low pressure zone or throat of the venturi 65 while the other leg is connected by a similar pipe 68 to the high pressure or upstream side of the venturi. A gas tank 69 is provided and this tank is connected by pipes 70 and 71 to pipes 67 and 68, respectively. Pipes 70 and 71 are provided with needle valves 72 and 73 adjacent the points of connection to pipes 67 and 68. It is contemplated that tank 69 be filled with a colorless fluid under high pressure, for example, liquid carbon dioxide, compressed air, nitrogen, and so forth. Needle valves 72 and 73 are then very slightly opened to allow a gas leakage into the leads 67 and 68 to the venturi 65, as indicated by the gas bubbles in Figure 6. Manometer 66 may be filled to the balance line a—a with any opaque liquid such as water and the like containing a suitable dye. Clearly, when gas bubbles into the upstream end of the venturi 65, the pressure in the leg of the manometer connected thereto is equal to that at its point of connection to the venturi. Similarly, the pressure in the manometer leg connected to the throat of the Venturi tube is equal to the throat pressure thereof. An assembly such as that described in Figure 1 is mounted on the low pressure leg of manometer 66. The position of the assembly above the balance line a—a measures the head h which is proportional to the differential head on the Venturi tube and is also a function of the flow of sewage through it. Since the gas pressure equals the pressure of sewage, a gas seal is interposed between the sewage and the opaque measuring liquid thereby protecting the latter against contamination.

Figure 7:
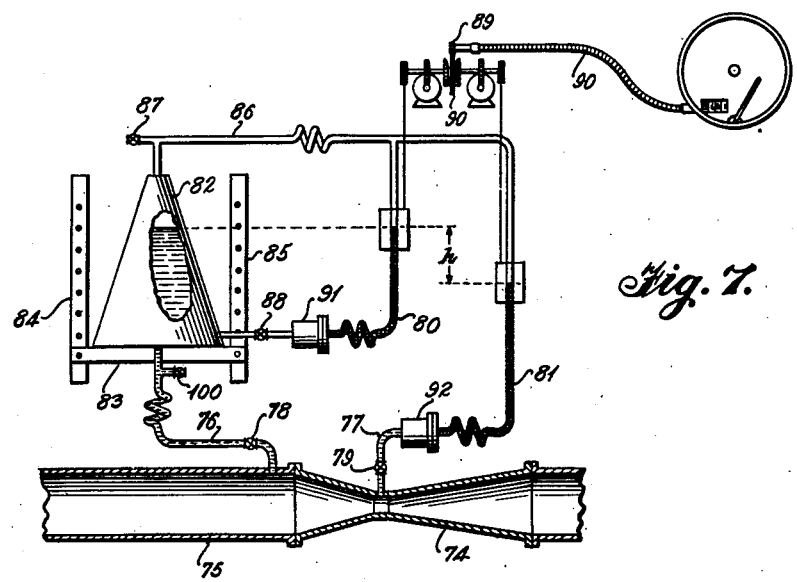
Figure 7 illustrates schematically a modification of the invention for recording and totalizing the flow of water through a Venturi tube by registering the actual differential head of water.

In Figure 7 there is shown an adaptation of this invention to recording and totalizing the flow of the liquid through a Venturi tube by registering the actual differential head of liquid in it, regardless of the pressure in the pipe. A Venturi tube 74 is provided in a pipe line 75 carrying a flow of liquid. A conduit 76 leads from the upstream side of the venturi while a similar conduit 77 leads from the throat thereof. Conduits 76 and 77 are provided with shut-off valves 78 and 79, respectively. Manometers 80 and 81 serve respectively the high and low pressure zones of the venturi.

Interposed between conduit 76 and manometer 80, there is a frusto-conical tank 82 supported on a beam 83 which may be placed at different heights by bolting to vertical bars 84 and 85 which are provided with a plurality of vertically spaced apertures for this purpose. The height of the liquid in the tank depends upon the pressure in pipe line 75. The top of tank 82 is connected by pipe 86 with the tops of the manometer tubes 80 and 81. A valve 87 is for the purpose of letting air into tank 82. When valve 87 is closed, the tube 86 is, of course, air-tight. When tank 82 is empty of liquid and full of air, and valve 78 is open, water will flow from the high pressure side of venturi 74 and compress air in the upper portion of tank 82 and in pipe line 86. This prevents the liquid in manometer 80 which is connected by a pipe line 88 to the bottom of tank 82 from rising above the liquid level in that tank. Of course, the air pressure on the top of manometer 81 is the same as that on top of manometer 80, but since the throat pressure in venturi 74 at the point of connection of pipe 77 is less than that at the point of connection of pipe 76, the liquid level in manometer 81 will be lower than in manometer 80 by a distance $h$ which is commonly called the Venturi head. It will be understood that head $h$ is a direct function of a rate of flow through venturi 74.

Two photo-electric cell assemblies, such as that shown in Figure 1, are used, one surrounding manometer 80 and the other surrounding manometer 81. These are moved by two motors in a manner hereinbefore explained. However, the sprocket shafts for driving the two housings are connected by differential gearing and a spur gear 89 is turned by a gear 90 to an extent proportional to the head $h$. Spur gear 89 drives a flexible shaft 90 which is connected to a recording mechanism, for example of the type shown in Patent 962,317. The chart of this recorder is turned by a clock, while the position of its pen is determined by the head $h$ and a cam within the recorder housing causes the pen to move proportional to the rate of flow which is a single valued function of the head $h$. Within the recorder is a totalizing mechanism which is operated by the combined action of a time clock and the photo-electric cell assembly such that the total volume of flow is registered by the recorder. In this way, the recorder is caused to register the rate of flow and the total volume of flow.

Upon further reference to Figure 7, it will be noted that conduit 88 is not connected directly to manometer 80, nor is conduit 77 directly connected to manometer 81. On the contrary, housings 91 and 92 are interposed, the details of which may be viewed in Figure 8. Housings 91 and 92 being identical, the description will be confined to housing 91. Pipe 88 leads into sealed housing 91. Within the housing is a flexible bag 93, the interior of which is connected to the tube of manometer 80 by a short connection 94. Except for connection 94, the interior of housing 91 is entirely sealed by a plate 95 held in position by bolts 96 drawn against flanges 97 of housing 91 by nuts 98. A plug 99 serves as an air vent when the apparatus is first put into use. It can be seen that flexible bag 93 constitutes a means of segregating the liquid in manometer 80 from the liquid in tank 82. Thus, liquid entering housing 91 under pressure will compress flexible bag 93 causing the latter to eject the dyed manometer liquid through connection 94 into manometer 80. If the pressure in housing 91 drops, resilient bag 93 expands drawing manometer liquid into itself and lowering the height of the column in manometer 80.

Figure 8:
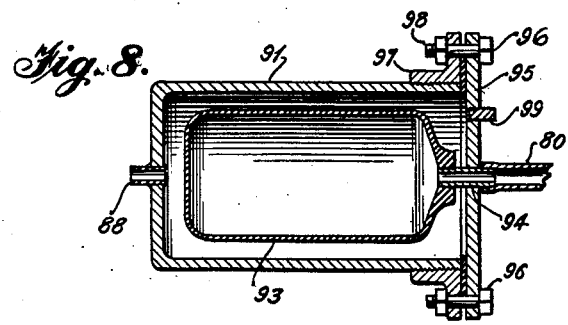
Figure 8 is a detail view of a portion of the apparatus shown in Figure 7.

The advantage in using the construction of Figure 8 instead of an alternative plan involving opaque floats on the liquid surface of the manometers is that the photo-electric cell assembly will automatically reset itself to the correct position after a power interruption during which the liquid levels might have undergone material change.

In order to prevent oscillation of the liquid surface in the manometer, a portion of the tube on the discharge side of the housing 91 is coiled and of small diameter. Of course, by this arrangement any degree of damping is possible.

The advantages of interposing pressure tank 82 in the line to the upstream tap of the venturi is to lengthen the time of operation without resetting the photocell housings. Under pressure air is dissolved by the water and carried out as the water levels fluctuate. The liquid levels in both manometers will therefore continue to rise although the difference in their levels always shows the correct head on the Venturi tube or orifice. When the levels in the high pressure manometer rises so high that the photo-electric cell assembly can no longer follow it, valves in the lines to the manometer tubes are closed and the pressure tank is emptied of water through a blow-off valve 100 and filled with air through valve 87. When water is again allowed to flow into the pressure tank, the relative levels in the manometers are lowered to their original position.

There is some advantage in using a conical pressure tank because the pipe line pressure may then vary widely with only moderate fluctuations in the liquid in the high pressure manometer whose surface is always at the same level as that in the pressure tank.

Although in the specification and the accompanying drawings there is shown and described a preferred embodiment of this invention and various modifications thereof, and although various alternatives are suggested, these are not intended to be exhaustive nor limiting of the invention, but, on the contrary, are given for the purpose of illustrating it and instructing others in the principles thereof as well as the best practical manner of utilizing the invention in order that others may be enabled to modify it and apply it in numerous forms each as may be best suited as to conditions and requirements in any particular instance.

What is claimed is:

1. In a flow registering device including a measuring means wherein the drop in pressure is an index of the rate of flow, a pair of stationary manometers with transparent walls connected respectively to the high and low pressure sides of the measuring device, a housing surrounding each manometer and slidable therealong, a light source and a pair of photo-electric cells disposed in each housing on opposite sides of each manometer, a column of liquid in each manometer the level of which determines the amount of light reaching each of the pairs of cells from their respective light source, a pair of reversible motors, differential gearing connecting the rotors of the two motors, cell controlled means responsive to one relative position of the cells in one housing and the column of liquid in the respective manometer for immobilizing one of said motors, said means causing actuation of said motor upon movement of said cells and column away from said one relative position, the direction of relative movement controlling the effective driving direction of said motor, corresponding means controlling the other motor from the liquid level in the other manometer, means responsive to the actuation of each motor for restoring the respective housing and the cells therein to that relative position with respect to the liquid in the manometer which it surrounds in which the motor is immobilized, and means driven by said differential gearing for registering the difference in levels of the liquids in the two manometers.

2. In a flow registering device including a measuring means wherein the drop in pressure is an index of the rate of flow, a pair of stationary manometers with transparent walls connected respectively to the high and low pressure sides of the measuring device, a housing surrounding each manometer and slidable therealong, a light source and a pair of photo-electric cells disposed in each housing on opposite sides of each manometer, a column of liquid in each manometer the level of which determines the amount of light reaching each of the pairs of cells from their respective light source, a pair of reversible motors, differential gearing connecting the rotors of the two motors, cell controlled means responsive to one relative position of the cells in one housing and the column of liquid in the respective manometer for immobilizing one of said motors, said means causing actuation of said motor upon movement of said cells and column away from said one relative position, the direction of relative movement controlling the effective driving direction of said motor, corresponding means controlling the other motor from the liquid level in the other manometer, means responsive to the actuation of each motor for restoring the respective housing and the cells therein to that relative position with respect to the liquid in the manometer which it surrounds in which the motor is immobilized, means driven by said differential gearing for registering the difference in levels of the liquids in the two manometers, and means for converting the difference of levels into terms of rates of flow and totalized flow.

3. In a liquid level registering device including a flow measuring device in which the difference of two pressures is an index of flow, a pair of transparent walled manometers, one connected to the high pressure side and the other to the low pressure side of the flow measuring device, an opaque liquid in each manometer, the level of which is controlled by the pressure in the measuring device at the point of attachment of that manometer, a pressure tank in the high pressure line, an air-tight connection between the tank and the tops of the two manometers, the connection between the high pressure side of the flow measuring device and the respective manometer being through said tank, a housing surrounding each manometer and slidable therealong, a light source and a pair of photo-electric cells disposed in each housing on opposite sides of each manometer, the level of the opaque liquid in each manometer determining the amount of light reaching each of the pairs of cells from their respective light source, a pair of reversible motors, differential gearing connecting the rotors of the two motors, cell controlled means responsive to one relative position of the cells in one housing and the column of liquid in the respective manometer for immobilizing one of said motors, said means causing actuation of said motor upon movement of said cells and column away from said one relative position, the direction of relative movement controlling the effective driving direction of said motor, corresponding means controlling the other motor from the liquid level in the other manometer, means responsive to the actuation of each motor for restoring the respective housing and the cells therein to that relative position with respect to the liquid in the manometer which it surrounds in which the motor is immobilized, and means driven by said differential gearing for registering the difference in levels of the liquids in the two manometers.

4. In a liquid level registering device including a column of opaque liquid in a translucent vertical tube, a support mounted for movement lengthwise of the tube, a light source carried by said support on one side of said tube, a pair of photoelectric cells attached to said support at spaced points thereon at approximately the same level as the light source and on the opposite side of the tube from said light source to receive light directly from the light source through the tube, both of said cells being in alignment with said light source through said tube, a vertical partition between the cells and extending adjacent to the tube to separate the cells, a mask joining said partition and extending laterally from the partition to lie between the light source and one of said cells, and another mask also joining said partition and extending laterally from the partition in a direction substantially opposite from the first mask to lie between the light source and the other cell, said masks and partition thereby cooperating to form a separate compartment for each cell and the light source, one of the masks having an opening therethrough at one level and in the line of the passage of light from the light source to the corresponding cell, and the other mask having an opening therethrough at a different level and in the line of the passage of light from the light source to the other cell, a motor, cell controlled means responsive to one relative position of said cells and said column for immobilizing said motor, said means causing actuation of said motor upon relative movement of said cells and column away from said one relative position, the direction of relative movement controlling the effective driving direction of the motor, means establishing a driving connection between said motor and said support so that the support is moved by the motor to restore the cells to the one relative position in which the motor is immobilized, and means responsive to actuation of the motor for registering indicia correlated with the level of the column.

5. In a liquid level registering device including a column of opaque liquid in a translucent tube, a light source on one side of said tube, a support mounted for movement lengthwise of the tube, a pair of photoelectric cells attached to said support at spaced points thereon, both of said cells being in alignment with said light source through said tube, a motor, cell controlled means responsive to one relative position of said cells and said column for immobilizing said motor, said means causing actuation of said motor upon relative movement of said cells and column away from said one relative position, the direction of relative movement controlling the effective driving direction of the motor, means establishing a driving connection between said motor and said support so that the support is moved by the motor to restore the cells to the one relative position in which the motor is immobilized, and means responsive to actuation of the motor for registering indicia correlated with the level of the column, the improvement which comprises, a sleeve surrounding said tube and attached to said support, said sleeve having a pair of vertically offset horizontally spaced light openings on one side thereof and a single light opening on the other side thereof in registry with said pair, and a plurality of light masks extending radially from said sleeve and isolating said cells from each other and each cell from the light source except through said tube, said light source being mounted on said support adjacent the single opening.

6. In a registering device wherein pressure differential is an index of the data to be registered, a pair of stationary manometers with transparent walls connected respectively to the high and low pressures between which the differential is to be measured, a housing surrounding each manometer and slidable therealong, light emitting means and a pair of photoelectric cells disposed in each housing on opposite sides of each manometer, a column of liquid in each manometer the level of which determines the amount of light reaching each of the pairs of cells from their respective light emitting means, a pair of reversible motors, cell controlled means responsive to one relative position of the cells in one housing and the column of liquid in the respective manometer for immobilizing one of said motors, said means causing actuation of said motor upon movement of said cells and said column away from said one relative position, the direction of relative movement controlling the effective driving direction of said motor, corresponding means controlling the other motor from the liquid level in the other manometer, means responsive to the actuation of each motor for restoring the respective housing and the cells therein to that relative position with respect to the liquid in the manometer which it surrounds in which the motor is immobilized and means connected to the rotors of the two motors for registering the difference in level between the columns in the two manometers.

JOHN C. STEVENS.